United States Patent [19]
Moriya et al.

[11] Patent Number: 6,104,660
[45] Date of Patent: Aug. 15, 2000

[54] BATTERY MODULE AND BATTERY MANAGING SYSTEM

[75] Inventors: Akihiro Moriya; Kyouichi Sasamoto; Morisige Kinjo, all of Tokyo, Japan

[73] Assignee: Kabushiki Kaisha Toshiba, Kawasaki, Japan

[21] Appl. No.: 09/181,817

[22] Filed: Oct. 29, 1998

[30] Foreign Application Priority Data

Oct. 30, 1997 [JP] Japan .................................. 9-298770

[51] Int. Cl.[7] ...................................................... G11C 7/00

[52] U.S. Cl. .......................................... 365/228; 365/226

[58] Field of Search .................................... 365/228, 226; 320/127, 133, 134, 136, 112, 110

[56] References Cited

U.S. PATENT DOCUMENTS

| | | | |
|---|---|---|---|
| 4,387,334 | 6/1983 | Loper | 320/44 |
| 5,615,111 | 3/1997 | Raskas et al. | 364/410 |
| 5,710,501 | 1/1998 | Van Phuoc et al. | 320/2 |
| 5,854,549 | 12/1998 | Paulick | 320/110 |

*Primary Examiner*—David Nelms
*Assistant Examiner*—David Lam
*Attorney, Agent, or Firm*—Finnegan, Henderson, Farabow, Garrett & Dunner, L.L.P.

[57] ABSTRACT

A battery module comprises at least one battery, and one or more memory sections for memorizing management information of the at least one battery at cutting operation of connection, when a connection between the at least one battery and at least one external device is cut, and the at least one battery and the memory sections are structured as one body.

8 Claims, 5 Drawing Sheets

BATTERY MODULE AND BATTERY MANAGING SYSTEM

BACKGROUND OF THE INVENTION

The present invention relates to a battery module and a battery managing system thereof, especially, to a battery module suitable to use such as power supply for power failure to such a system for backing up data of computer system etc. and a battery managing system thereof.

In various equipment, devices or computer systems, the battery for the emergency is prepared for a power failure in addition to a main power supply. Moreover, a use of the battery is not limited to such an emergency case, and the battery is used widely as a power supply for the system.

The use state of this battery is occasionally managed by using the microprocessor etc. in consideration of maintenance of the system function or the importance of the data backup.

In this case, hardware and software are divided according to the function. For instance, the battery is composed of the unit which can be exchanged as a module (Hereafter, called the battery module). And, the state of this battery module is managed by the microprocessor module etc. which contain the microprocessor. Here, state information to be managed includes time that the battery was built in the system, the remainder of the battery amount, the present status of the battery, and the situations of the occurrence of the power failure, etc. The microprocessor judges the situation of the charge and discharge of the battery by regularly updating this state information at the exchange time of the battery.

Figure 1:
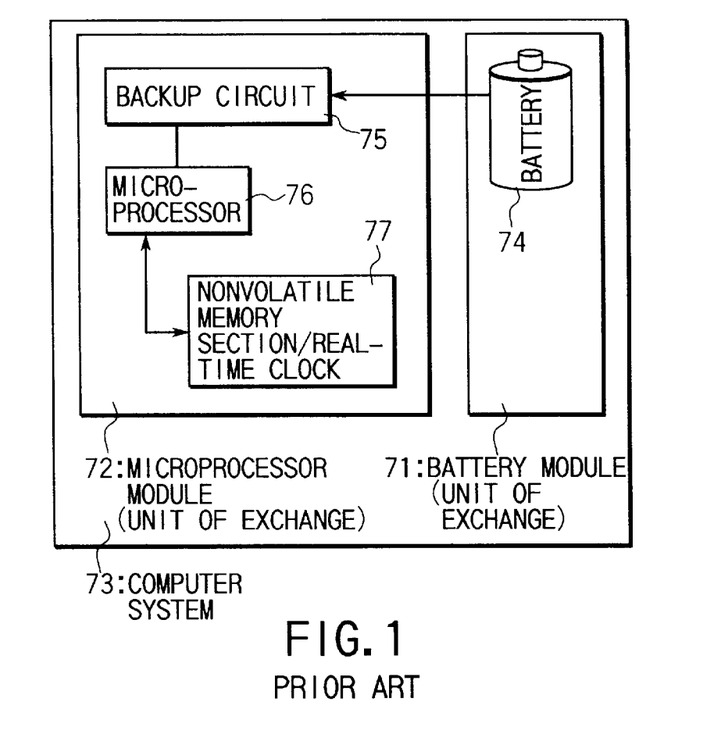
FIG. 1 is a block diagram showing an example of the construction of the conventional battery managing system.

FIG. 1 is a block diagram showing an example of the construction of the conventional battery managing system.

This battery managing system has a microprocessor module 72 and a battery module 71 which are each a unit of exchange, respectively. The battery managing system is a part of a computer system 73 such as file servers.

In the example of FIG. 1, a microprocessor module 72 has a data backup function of a computer system 73, and when a power outage occurs, makes a backup circuit 75 operate by the electric power from a battery 74 of a battery module 71.

Moreover, the microprocessor 76 in the microprocessor module 72 not only controls the backup circuit 75, but also manages information of the above-mentioned battery module 71 by using a real-time clock & nonvolatile storage section 77.

Specifically, the microprocessor 76 regularly checks the state of the output of the battery etc. The microprocessor 76 obtains time information from the real-time clock in the real-time clock & nonvolatile storage section 77 in addition based on the result of this state check and the information at the time of exchanging the battery module to generate the management information. The management information is stored in the nonvolatile memory section in the real-time clock & nonvolatile storage section 77.

In the system, one can exchange the battery and the use management function in the battery module 71 and the microprocessor module 72. Only the battery module 71 is exchanged due to lifetime and the trouble of the battery, and only the microprocessor module 72 is separately exchanged respectively due to the trouble of the microprocessor peripheral circuit etc.

Here, since the battery management information is memorized in the nonvolatile memory section in the real-time clock & nonvolatile storage section 77 in the microprocessor module 72, it is necessary to work to succeed the management information when the exchange of the microprocessor module 72 is generated. If this successive work is not done, for example, the microprocessor module 72 judges the battery under use to be a new battery module by mistake.

On the other hand, the exchange is not required from beginning of use to finish of use in the conventional battery module 71. Therefore, when the battery module 71 is exchanged by non-regular reason there is no means to detect the battery module being exchanged. The microprocessor module 72 succeeds state information (management information) on the battery before exchanging the battery. Therefore, in this case, the microprocessor module 72 cannot judge the exchanged battery as a new battery.

BRIEF SUMMARY OF THE INVENTION

An object of the present invention is to provide a battery module and a battery managing system capable of correctly managing the state information of the battery even if the battery or managing function of the use state information is exchanged when the battery is under use.

To solve the above-mentioned problem, a battery module according to the present invention comprises at least one battery; and one or more memory sections for memorizing management information of the at least one battery, when a connection between the at least one battery and at least one external device is cut, and the at least one battery and the memory sections are structured as one body.

As a result, since a nonvolatile memory section uses the presence of a mere electrical connection is installed in the battery module, even if the battery or the managing function of the use information is exchanged, the use state of the battery can be correctly managed.

A preferred manner of the present invention is as follows.

(1) The memory sections include a fuse. The memory section can be provided simply and cheaply according to this manner besides a similar advantage to the above-mentioned is achieved.

(2) The memory sections include a nonvolatile memory element. A similar advantage can be achieved in this manner.

In addition, a battery module according to the present invention comprises at least one battery; a memory section for memorizing management information of the at least one battery; and a clock section for generating information relating to time information among management information of the at least one battery, and the at least one battery and the memory sections are structured as one body.

With above-mentioned structure, since the memory section and the memorized united time information to generate use state information is provided, even if the battery or the managing function of use state information of the battery is exchanged under use, the use state of the battery can be managed in high accuracy.

In the above-mentioned battery module, a connection terminal to an external device to be arranged is further provided, and the connection of the battery module and the external device is recognized by the external device by connecting the connection terminal with a terminal provided in the external device. With such a construction, a similar advantage to the above-mentioned is achieved, and automatic recognition of the battery module connection existence becomes possible at the external device side.

On the other hand, a battery managing system according to the present invention comprises a battery module as mentioned above; and a managing section connected to the memory section for judging whether or not the battery module can be exchanged based on use information of the battery memorized in the memory section, and for memorizing the use information of the battery generated by using time information from the clock section to the memory section.

With such a construction, even if the battery or the managing function of use state information of the battery are exchanged under use, the use state of the battery can be correctly managed.

Next, a battery managing system according to the present invention comprises a battery module as mentioned above; a managing section connected to the memory section and the clock section for judging whether or not the battery module can be exchanged based on use information of the battery, and for memorizing the use information of the battery generated by using time information from the clock section to the memory section; and a GND level fixation section for fixing the signal level on a signal line between the managing section and the battery module at the GND level when exchanging the battery module.

With such a construction, an electric influence by detaching the battery can be removed by fixing the signal level on the signal line between the managing means and the battery module at the GND level. Even when the system is in an operation, the battery module can be exchanged in addition to a similar advantage to the above-mentioned.

Moreover, in the above-mentioned each battery managing system, a power supply control section for intercepting a power supply to the memory section and the clock section is further provided when exchanging the battery module.

With such a construction, an influence from the power supply can be avoided by cutting off the electric power supply to the memory section and the clock section when the battery module is exchanged in addition to a similar advantage to the above-mentioned.

In addition, a battery module according to the present invention comprises at least one battery; and a memory section for management information of the at least one battery, and the at least one battery and the memory sections are structured as one body.

With such a construction, even if the battery or the managing function of use state information of the battery is exchanged under use, the use state of the battery can be correctly managed.

As above described concretely, according to the present invention, even if the battery or the managing function of use state information of the battery is exchanged under use, there are provided the battery module and the battery managing system, in which the use state of the battery can be correctly managed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Hereafter, an embodiment of the present invention will be explained.

First Embodiment

Figure 2:
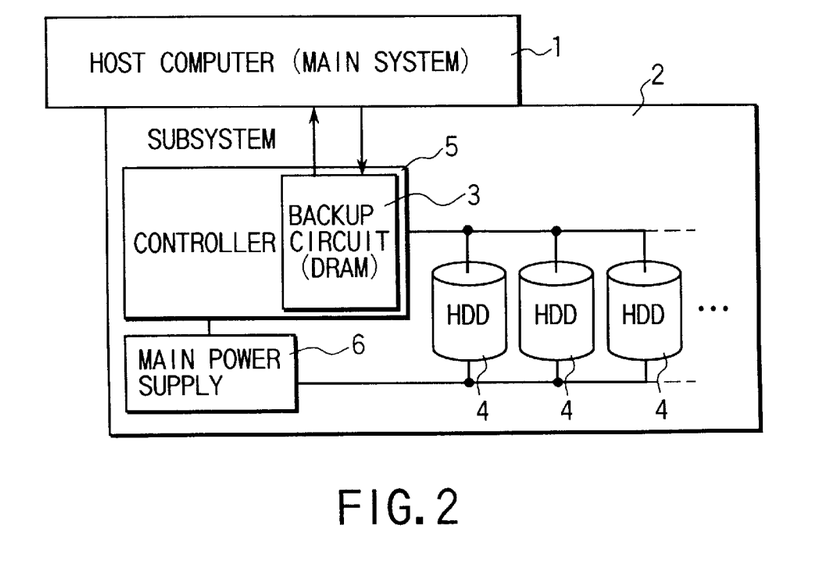
FIG. 2 is a construction showing an example of the computer system which applies the battery managing system according to the first embodiment of the present invention is shown.

FIG. 2 is a construction showing an example of the computer system which applies the battery managing system according to the first embodiment of the present invention.

The computer system of FIG. 2 consists of a host computer 1 and a subsystem 2. For example, the computer system constructs the file server system and the data server system.

The subsystem 2 is composed as a magnetic disk drive to secure high-speed processing of the host computer 1, and the subsystem 2 performs the write back of data to the hard disk drive 4 and the backup of cache, etc. by using the backup circuit 3 with DRAM. For instance, this subsystem 2 can be composed as Raid system (RAID).

Since DRAM is a volatile memory, when a main power supply 6 where the power supply is supplied to a controller 5 and a hard disk drive 4 which store the backup circuit 3 is cut off due to the power failure etc., data in the backup circuit 3 is lost. To prevent this, the battery module 20 for power failure is installed in the controller 5 as shown in FIG. 3.

Figure 3:
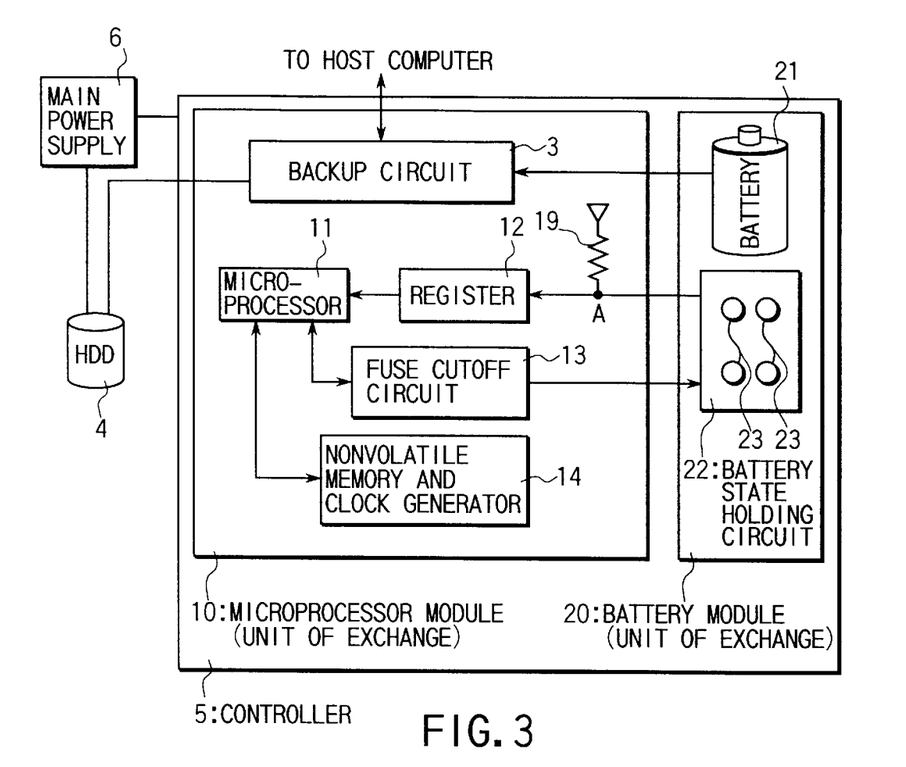
FIG. 3 is a block diagram showing an example of the construction of the battery managing system of the embodiment.

FIG. 3 is a block diagram showing an example of the construction of the battery managing system of this embodiment.

This battery managing system has function of a part of the microprocessor module 10 and the battery module 20 in the controller 5.

The microprocessor module 10 has an exchangable structure for each module. This microprocessor module 10 has the backup circuit 3, a microprocessor 11, a register 12, a fuse cutting circuit 13, and a nonvolatile memory & clock providing section 14.

On the other hand, the battery module 20 can be exchanged in the the each module. This battery module 20 is composed of a battery 21 and a battery state holding circuit 22.

First of all, each construction of the microprocessor module 10 will be explained.

The backup circuit 3 is a circuit which achieves the essential function which the microprocessor module 10 of this embodiment provides. This backup circuit 3 has DRAM, and backs up data by receiving the power supply from the battery 21 at the power failure.

The microprocessor 11 manages all of the controller 5. The information at the use time of the battery module 20 etc. is managed by reading the state of a fuse 23 of the battery state holding circuit 22 as management information through the register 12, and memorizing use information of the battery in the battery state holding circuit 22 by using the fuse cutting circuit 13. Moreover, the time managing information is obtained from the real-time clock installed in the nonvolatile memory & clock providing section 14. In addition, the same information as information read from the battery state holding circuit 22 and the date of previous instruction of cutting off the fuse are stored in a nonvolatile memory section in the nonvolatile memory & clock providing section 14.

The register 12 sends state information of the fuse 23 in the battery state holding circuit 22 to the microprocessor 11. Specifically, a pull-up resistor 19 is connected with node A between the register 12 and each fuse 23. H level information, which corresponds to 5V, is stored in the register 12 corresponding to cut the fuse 23 by the pull-up resistors 19. On the other hand, L level information, which corresponds to 0V (GND) corresponding to uncut the fuse 23, is stored in the register 12.

The fuse cutting circuit 13 cuts the specified fuse by applying the overcurrent based on the request by the microprocessor 11 among two or more fuses 23 installed in the battery state holding circuit 22. Information indicated by the cutting state of the fuse 23 becomes a record showing use information of the battery.

Figure 4:
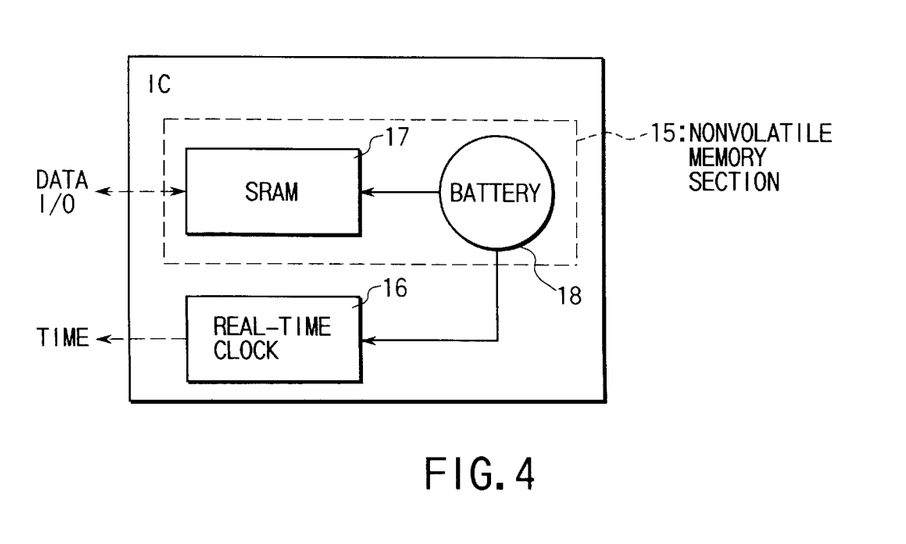
FIG. 4 is a construction of a nonvolatile memory & clock providing section according to the embodiment.

The nonvolatile memory & clock providing section 14 has an IC (integrated circuit) which consists of a nonvolatile memory section 15 and a real-time clock 16 as shown in FIG. 4.

FIG. 4 is a structure of a nonvolatile memory & clock providing section 14 according to the embodiment.

The nonvolatile memory & clock providing section 14 has an SRAM 17, a real-time clock 16, and a battery 18 as shown in FIG. 4. The battery 18 supplies the electric power to the SRAM 17 and the real-time clock 16. Moreover, the nonvolatile memory section 15 is composed by a battery 18 as the power supply and a SRAM 17.

Thus, the nonvolatile memory section 15 becomes a memory section which can hold data even if the power supply of the system is turned off, and memorize the management information of the battery module (use state information of the battery shown in the fuse and the fuse cutting time etc.). On the other hand, the real-time clock 16 provides time information necessary for managing the battery.

Next, the construction of each section of the battery module will be explained.

The battery 21 supplies the electric power to the backup circuit 3 to back up necessary data when the power failure occurs. The battery 21 may be a primary battery and a secondary battery. The exchange work is regularly necessary for the battery because of lifetime etc.

The battery state holding circuit 22 is a circuit memorizing the use of the battery 21 composed by two or more fuses 23. Each fuse 23 has one end connected with the corresponding bit in the register 12 and another end is grounded. Moreover, each fuse 23 has specific information. The battery state can be automatically detected from the microprocessor 11 by checking these.

Next, an operation of the battery managing system according to the embodiment of the present invention constructed as mentioned above will be explained by using FIG. 5.

Figure 5:
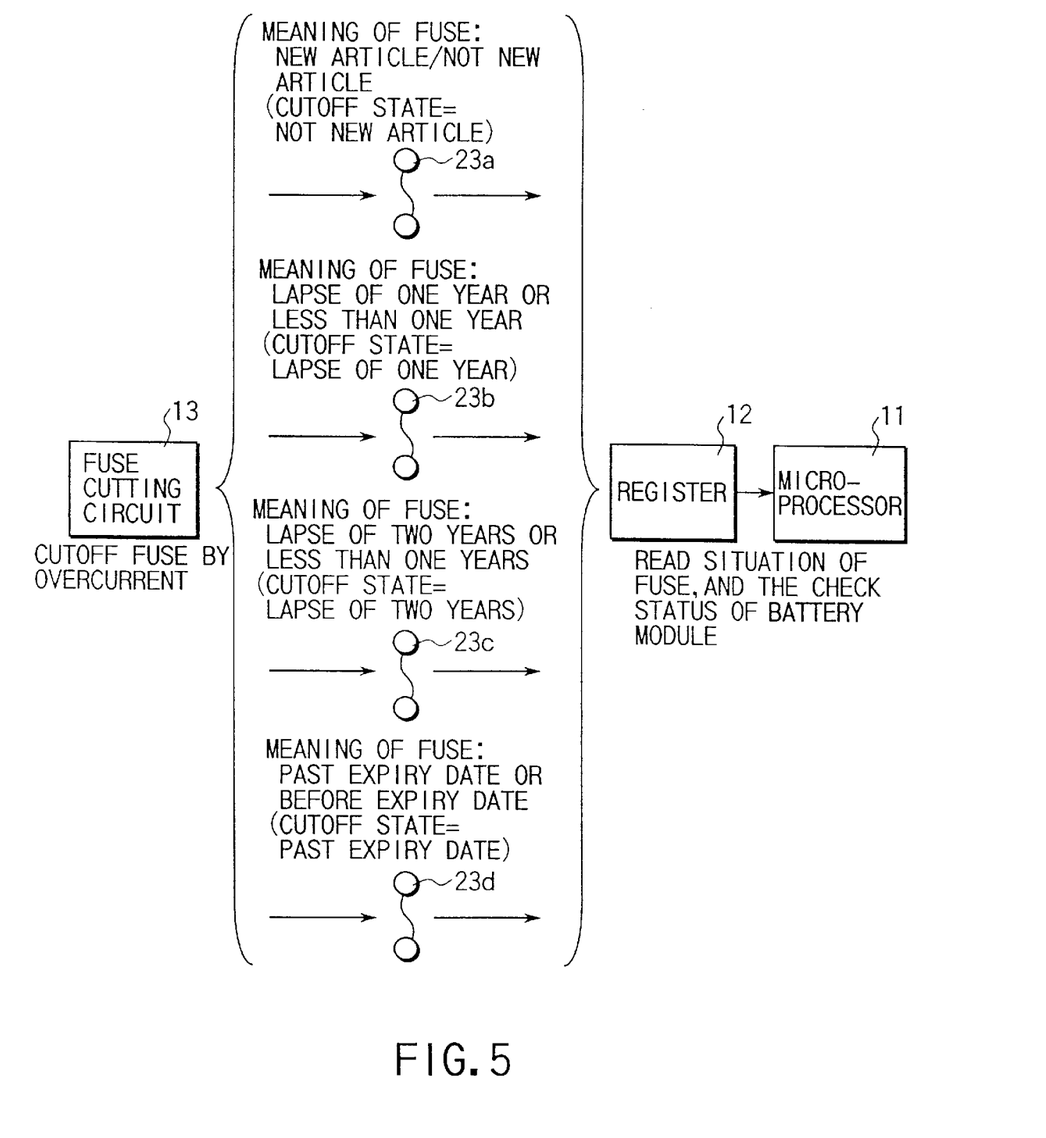
FIG. 5 is a fuse state in the battery module of the embodiment.

In the battery state holding circuit 22, it is assumed four fuses 23 are used to record the use state of the battery.

FIG. 5 is a fuse state in the battery module of the embodiment.

All fuses 23 (fuses 23a, 23b, 23c, and 23d in FIG. 5) are in a connected state when the battery module 20 is in a new article.

First of all, since one ends of all fuses 23 is grounded when new battery module 20 is set by the controller 5, all the corresponding bits in the register 12 become L levels, that is, "0".

The content of the register 12 is confirmed at a constant cycle by the microprocessor 11. The microprocessor 11 judges that new battery module 20 is set when the microprocessor 11 detects the corresponding information of all fuses 23 are all "0". The microprocessor 11 records such information in nonvolatile memory section 15, and instructs to cut the fuse 23a into the fuse cutting circuit 13. Moreover, time information to have cut the fuse 23a (date etc.) is recorded in the nonvolatile memory section 15 at this time.

This fuse 23a is cut by inputting the overcurrent from the fuse cutting circuit 13. Thus, a fact that the battery module 20 is not a new article is recorded by cutting a predetermined fuse in the battery state holding circuit 22.

Moreover, since the correspondence bit of the register 12 is cut off from the earth by cutting the fuse 23a, the bit becomes H level, that is, "1" with the pull-up resistor 19.

This state information is read by the microprocessor 11, and stored in the nonvolatile memory section 15. At this time, the microprocessor 11 informs such information if the read state information indicates the exchange time of the battery module 20 by the informing means (not shown). Moreover, the microprocessor 11 compares time from date when the fuse was cut last time and the current time from the real-time clock 16, and judges whether or not time is elapsed that next fuse 23 should be cut.

In this embodiment, the fuse 23a means whether the battery module 20 is a new article as shown in FIG. 5, and the fuse 23b means whether the battery module 20 passes one year from the start of use. Similarly, it is meant whether the fuse 23c passes two years passed from start of use. Moreover, the fuse 23d means whether the battery module 20 is past expiry date.

In this case, since the fuse 23a has already been cut, after one year passes from start of use (after a predetermined time passes from the fuse cut at last time), the cutting instruction of the fuse 23b is output from the microprocessor 11.

When neither the microprocessor module 10 nor the battery module 20 is exchanged, the fuses 23c and 23d are cut one after another thus as the time of the battery use passes. The microprocessor 11 informs information when last fuse 23d is cut by passing the expiry date.

Next, a case of which the battery module 20 is exchanged before expiry date (e.g., lapse of one year and less than two years) will be explained.

For example, it is assumed the battery module 20 is exchanged at a time when the fuses 23a and 23b are cut (that is, lapse of one year and less than two years).

Since all bits showing the state of the battery are "0" when the content of register 12 is confirmed by the microprocessor 11 after exchanging the battery module 20, the microprocessor 11 can recognize that the battery module 20 is exchanged.

Then, the microprocessor 11 records the state of the battery and the starting use date in the nonvolatile memory section 15, and instructs to cut the fuse 23a into the fuse cutting circuit 13. Since the operation after that is similar to the above-mentioned operation, the explanation will be omitted.

Next, a case of which the microprocessor module 10 is exchanged before expiry date of the battery module 20 (e.g., lapse of one year and less than two years) will be explained.

For example, it is assumed the microprocessor module 10 is exchanged at a time when the fuses 23a and 23b are cut (that is, lapse of one year and less than two years).

After the microprocessor module 10 is exchanged, the microprocessor module 10 confirms the state of the register 12, and detects the fuses 23a and 23b being cut. The result is recorded in the nonvolatile memory section 15, and since the cutting date of the fuse 23b is uncertain, time thereof is recorded as a cutting date of the fuse 23b.

Since the operation after that is similar to the above-mentioned operation, the explanation will be omitted.

In the embodiment, since a case for four fuses 23 is explained for convenience sake as an example, the error of one year or less will be caused since the cutting date of the fuse 23b cannot be specified when the microprocessor module 10 is exchanged. However, by increasing the number of the fuses 23 for example when applying to an actual system, such an error can be reduced as much as possible.

As described above, since the battery module and the battery managing system according to the embodiment of the present invention comprise the fuse 23 as a nonvolatile recording means of the management information in the battery module and records use information of the battery, microprocessor can accurately judge whether the battery is a new article and how much time has passed after the battery is built in to the system even when the module of the battery and the microprocessor are separately exchanged. Moreover, a simple and cheap circuit can be constructed by using the fuse 23.

The cutting date of each fuse is recorded in the nonvolatile memory section 15 in the embodiment. The present invention is not limited to this case. The starting use date of the battery module 20 is recorded, for example, and the time management of the fuse cutting may be performed based on the recorded date. In this case, the starting use date is made at the elapsed time of use indicated from the fuse state and a time when the microprocessor module 10 is exchanged.

The fuse 23 is used as a means to record the management information in the battery state holding circuit 22 in the embodiment. The present invention is not limited to this case. Various means such as a breaker, a relay, and a contact can be applied as the state record means if the connection can be cut off from the microprocessor 11 by an electrical control.

Second Embodiment

In the first embodiment, the battery module has the battery state holding circuit. In this embodiment, the nonvolatile memory element is used for the battery module as a battery state holding circuit. The higher accurate battery management is achieved by controlling the nonvolatile memory element from the microprocessor module.

However, when the nonvolatile memory element is mounted on the battery module, it becomes difficult to cut an electrical connection with the microprocessor module under operation of the system, and the battery module under operation of the system cannot be exchanged.

The second embodiment shows the construction capable of exchanging the battery module under operation of the system while achieving a highly accurate battery management.

Figure 6:
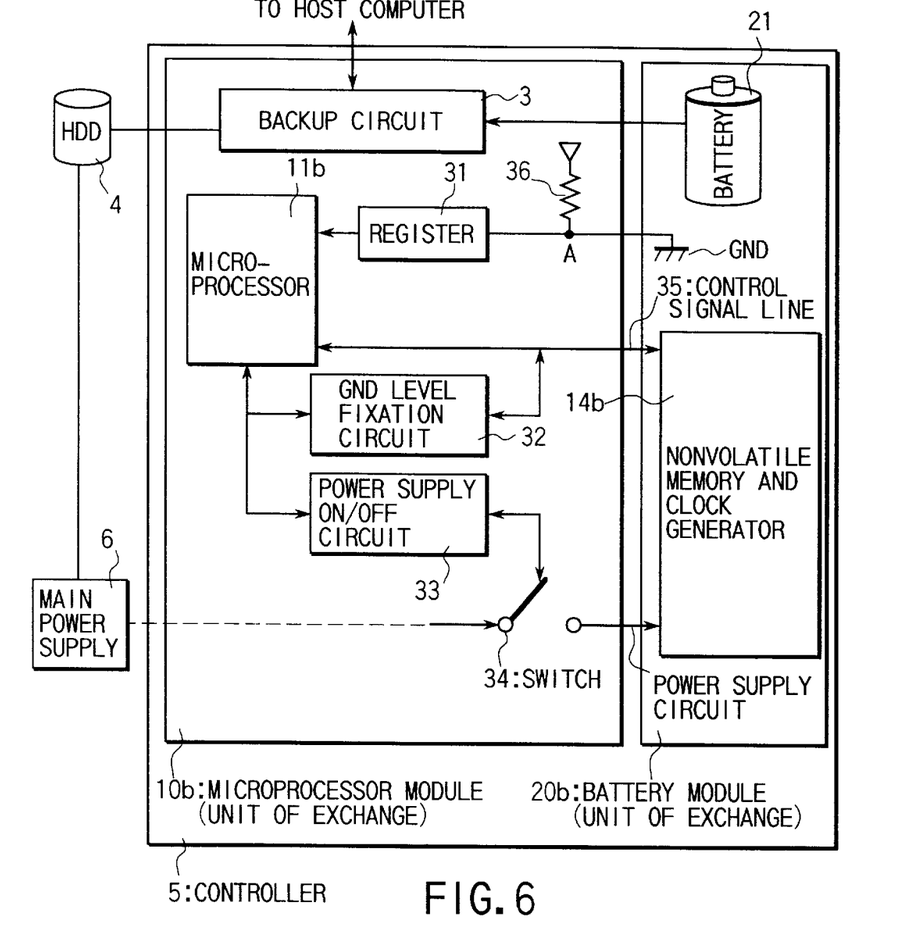
FIG. 6 is a block diagram showing an example of the construction of the battery managing system according to the second embodiment of the present invention.

FIG. 6 is a block diagram showing a structural example of the battery managing system according to the second embodiment of the present invention. In FIG. 6, the same reference numerals will be attached to the same sections of FIG. 2 and FIG. 3, and an explanation will be omitted. Here, only a different part will be described.

The battery managing system in this embodiment is applied to a similar case to the first embodiment.

The battery managing system of this embodiment has a microprocessor 11b on a microprocessor module 10b side, a register 31, a GND level fixation circuit 32, a power supply ON/OFF circuit 33, a switch 34, a battery 21 on a battery module 20b side, and a nonvolatile memory & clock providing section 14b.

Hereafter, the construction of each section will be explained.

The microprocessor 11b controls the backup circuit 3 as well as in the first embodiment, and performs the battery information management and the control of the exchange of the battery module 20b.

The use information management of the battery module 20b is performed as follows. First of all, a new use state information is generated by obtaining the use state information and time information necessary for managing the battery from the nonvolatile memory & clock providing section 14b allocated on the battery module 20b side. A new generated information is recorded in the nonvolatile memory & clock providing section 14b again. At this time, an information transfer to the nonvolatile memory & clock providing section 14b is performed by controlling a nonvolatile memory section and a real-time clock through microprocessor 11b and control signal line 35 arranged between the microprocessor 11b and the nonvolatile memory & clock providing section 14b.

Here, the nonvolatile memory & clock providing section 14b has a similar construction to the nonvolatile memory & clock providing section 14 of the first embodiment shown in FIG. 4, and the nonvolatile memory & clock providing section 14b is arranged in the battery module 20b. That is, the nonvolatile memory & clock providing section 14b has the nonvolatile memory section 15 and the real-time clock 16.

The microprocessor 11b controls the GND level fixation circuit 32 and the power supply ON/OFF circuit 33 when the battery module is exchanged to make the battery module exchangeable state even when the system is in an operation state.

When the battery module 20b is set, the register 31 stores information for the microprocessor 11b to detect a fact thereof. When the battery module 20b is set, the register 31 can be connected with the battery module 20b, and a connected terminal of the register 31 is grounded in the battery module 20b. On the other hand, pull-up resistor 36 is connected with node A between the register 31 and the battery module 20b. Therefore, by a similar operation as register 12 of the first embodiment, information at L level ("0") is stored in the register 31 when the battery module 20b is set to the controller 5, and information at H level ("1") is stored in the register 31 if not so. As a result, the microprocessor 11b detects the set state of the battery module 20b.

When the battery module 20b is exchanged, the GND level fixation circuit 32 fixes the state of the signal of control signal line 35 where the control signal is in the high impedance state by stopping access of the microprocessor 11b at the GND level. This control is performed by the microprocessor 11b.

The power supply ON/OFF circuit 33 controls the power supply to the nonvolatile memory & clock providing section 14b in the battery module 20b. This control is performed by the microprocessor 11b. Though the nonvolatile memory & clock providing section 14b has the battery 18 as mentioned above as shown in FIG. 4, at a usual operation, a necessary electric power is supplied from the main power supply 6 through the switch 34.

The switch 34 turns on and off the power supply to a nonvolatile memory & clock providing section 14b in the battery module 20b at usual operation, and is controlled with the power supply ON/OFF circuit 33 based on the instruction from the microprocessor 11b.

Next, an operation of the battery managing system according to the embodiment of the present invention as mentioned above will be explained.

First, the content of the register 31 changes from "1" to "0" when the battery module 20b is newly set, and the fact of the module set is detected by the microprocessor 11b which periodically checks the content.

The content of use state information of the nonvolatile memory section 15 is read by the microprocessor 11b according to this detection.

At this time, it is judged that the battery module 20b is a new article when use state information is not memorized in the nonvolatile memory section 15 of the battery module 20b. In addition, the starting use date is recorded in the nonvolatile memory section 15 by the microprocessor 11b based on the time information from the real-time clock 16 of the battery module 20b.

The microprocessor 11b regularly reads the use state information and the time information from the nonvolatile memory & clock providing section 14b of the battery module 20b from then on. And, the elapsed time from the starting of use is judged based on these information, and the new use state information based on time information is memorized in the nonvolatile memory section 15. This use state information includes various information such as memory time based on the real-time clock 16, battery remainder, current battery situation, occurrence situation of the power failure. The real-time clock 16 is set as the reference time information, because clock means is generally provided at each section. Since the time of each of these clocks does not necessarily coincide in actuality, the use time can be calculated for a single meaning with the clock in the battery module 20b.

At this time, the use time of battery module 20b is calculated from the difference between the starting use date and the current date of the real-time clock 16. Since this calculated time is based on the same real-time clock 16, the use time becomes accurate. If the battery module 20b exchanged time from the calculated use time and other state information is informed by the microprocessor 11b.

All information on the battery always moves with the battery by performing such processing and various judgments are performed based on this information. As a result, even when either the microprocessor module 10b or the battery module 20b is exchanged, the use time is calculated in high accuracy according to the current state of the battery module 20b. Moreover, the use state is inspected and recorded accurately.

Next, the exchange processing of the battery module will be explained.

A battery managing as accurate as the above-mentioned became possible since the nonvolatile memory section 15 and the real-time clock 16 are provided in the battery module 20b. On the other hand, since the microprocessor module 10b is connected with the battery module 20b via control signal line 35, the battery module 20b can not be exchanged as it is under operation of the system. Hereafter, the method of exchanging the battery module 20b under operation of the system will be explained with reference to FIG. 7.

Figure 7:
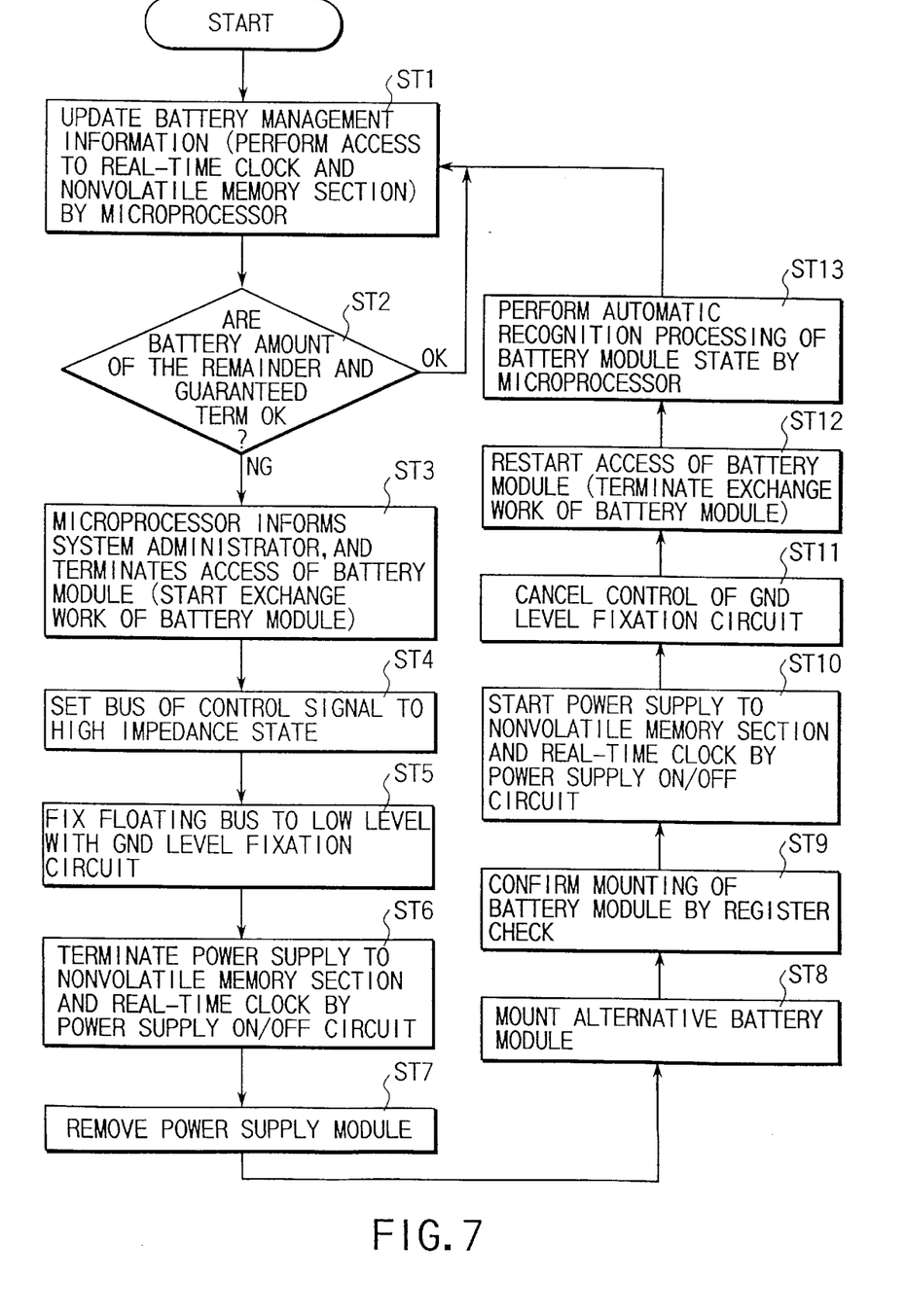
FIG. 7 is a flowchart showing a processing of the battery module exchange of the embodiment.

FIG. 7 is a flowchart showing the processing of the battery module exchange in the embodiment.

First of all, the battery information management by the microprocessor 11b is performed as described above (ST1). If it is judged to reach battery exchange time based on the battery remainder and the use period, etc. (ST2), the information is informed to the manager and the access to the battery module 20b by the microprocessor 11b is terminated (ST3). In addition, control signal line 35 is set in the high impedance state by the microprocessor 11b to show a fact that control signal line 35 is not used (ST4).

Next, control signal line 35 (floating bus) is fixed to the low level with the GND level fixation circuit 32 based on the instruction from the microprocessor 11b (ST5). The reason why control signal line 35 is fixed to the low level is that the circuit is destroyed when the current flows backward from the signal line 35 to the nonvolatile memory & clock providing section 14b.

Next, the switch 34 is opened with the power supply ON/OFF circuit 33 based on the instruction from the microprocessor 11b, and the electric power supply to the nonvolatile memory & clock providing section 14b is intercepted (ST6). The operation of the real-time clock 16 in the nonvolatile memory & clock providing section 14b is maintained with the battery 18.

Next, the battery module 20b is removed (ST7) and new battery module 20b is mounted (ST8).

When the battery module 20b is mounted, the content of the register 31 is changed. This information is read by the microprocessor 11b and the battery mounting is confirmed (ST9).

The power supply instruction is performed by the microprocessor 11b which confirms mounting of the battery module 20b, the switch 34 is closed with the power supply ON/OFF circuit 33, and the electric power is supplied to the nonvolatile memory & clock providing section 14b (ST10).

Next, the fixation of the low level on control signal line 35 is released by the GND level fixation circuit 32 (ST11) and the access to the battery module 20b by and the microprocessor 11b is restarted (ST12).

As described above, after use state information of the battery module 20b is confirmed and the above predetermined processing is executed, a regular battery managing situation is reset by the microprocessor 11b (ST1).

The battery module and the battery managing system according to the embodiment of the present invention have the nonvolatile memory section 15 and the real-time clock 16 in the battery module side, and record the use state information of the battery at the battery module side based on time information from the real-time clock 16 as mentioned above. As a result, even when the module of the battery and the microprocessor are separately exchanged respectively, battery information can be easily succeeded. And, highly accurate use state information can be secured regardless of an individual exchange of the module. As a result, managing them by man becomes needless. Moreover, the work mistake can be avoided when exchanging the module. Consequently, it is also possible to contribute to the reduction of the managing cost.

Moreover, since the register 31 is provided in the embodiment, it can be automatically recognized that the battery module 20b is connected by the microprocessor 11b.

The battery managing system according to the embodiment of the present invention has the GND level fixation circuit 32 and the power supply ON/OFF circuit 33. Therefore, even when the microprocessor 11b and the battery module 20b are connected via control signal line 35 and the power supply is supplied from the main power supply 6 to the nonvolatile memory & clock providing section 14b in a usual operation, the battery module 20b can be exchanged under operation of the system. As a result, in a system necessary for continuous operation, it becomes unnecessary to stop the system when exchanging the module.

The present invention can be variously transformed within the scope of the invention and is not limited to each above-mentioned embodiment.

Figure 8:
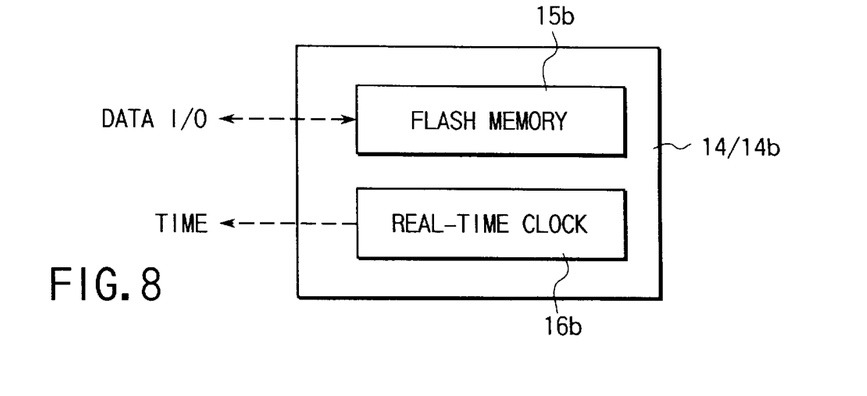
FIG. 8 is a block diagram showing another construction of a nonvolatile memory and clock providing section.

For example, a nonvolatile memory and a clock providing section as shown in FIG. 4 is used in each embodiment, the present invention is not limited to this case and may be constructed using flash memory 15b for a nonvolatile memory section as shown in, for example, FIG. 8. When this construction is used for the second embodiment, it is preferable to incorporate the battery into the real-time clock 16b of FIG. 8.

Moreover, in each of above embodiments, a case using a so-called computer system such as the file server system is explained, however the present invention is not limited to the computer system and can be applied to the equipment, device etc. of all fields using the battery module.

In addition, the technique described in the embodiment, especially, an operation of microprocessors 11 and 11b can be stored in storage media of the magnetic disk (floppy disk and hard disk drive, etc.), optical disks (CD-ROM and DVD, etc.), and the semiconductor memories, etc. for example as a program (software means) which can be executed by the computer (computer; including microprocessor), and distributed. Moreover, it is possible to distribute the program by transmitting by the communication medium. The program stored on the medium side includes a set program which composes the software means (including not only the execution program but also the table and the data structure) to execute software by the computer in the computer. The computer achieving the apparatus reads the program recorded in the memory medium and constructs the software with the situation by a set program. The processing mentioned above for controlling the operation of this software is executed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A battery managing system comprising:
    a battery module, which further comprises:
        at least one battery;
        a memory section for memorizing management information of said at least one battery; and
        a clock section for generating information relating to time information among management information of said at least one battery, wherein
        said at least one battery and said memory sections are structured as one body; and
    a managing section connected to said memory section for judging whether or not the battery module can be exchanged based on use information of said battery memorized in said memory section, and for memorizing the use information of said battery generated by using time information from said clock section to said memory section.

2. The battery managing system according to claim 1, further comprising a power supply control section for intercepting a power supply to said memory section and said clock section when exchanging said battery module.

3. A battery managing system comprising:
    a battery module, which further comprises:
        at least one battery;
        a memory section for memorizing management information of said at least one battery;
        a clock section for generating information relating to time information among management information of said at least one battery, wherein
        said at least one battery and said memory sections are structured as one body; and
        a connection terminal which is to be connected to an external device, wherein the connection of said battery module and said external device is recognized by said external device by connecting said connection terminal with a terminal provided in said external device; and
    a managing section connected to said memory section for judging whether or not the battery module can be exchanged based on use information of said battery memorized in said memory section, and for memorizing the use information of said battery generated by using time information from said clock section to said memory section.

4. The battery managing system according to claim 3, further comprising a power supply control section for intercepting a power supply to said memory section and said clock section when exchanging said battery module.

5. A battery managing system comprising:
    a battery module, which further comprises:
        at least one battery;
        a memory section for memorizing management information of said at least one battery; and
        a clock section for generating information relating to time information among management information of said at least one battery, wherein
        said at least one battery and said memory sections are structured as one body;
    a managing section connected to said memory section and said clock section for judging whether or not the battery module can be exchanged based on use information of said battery, and for memorizing the use information of said battery generated by using time information from said clock to said memory section; and
    a GND level fixation section for fixing the signal level on a signal line between said managing section and said battery module at the GND level when exchanging said battery module.

6. The battery managing system according to claim 5, further comprising a power supply control section for intercepting a power supply to said memory section and said clock section when exchanging said battery module.

7. A battery managing system comprising:

a battery module, which further comprises:
- at least one battery;
- a memory section for memorizing management information of said at least one battery;
- a clock section for generating information relating to time information among management information of said at least one battery, wherein
- said at least one battery and said memory sections are structured as one body; and
- a connection terminal which is to be connected to an external device, wherein the connection of said battery module and said external device is recognized by said external device by connecting said connection terminal with a terminal provided in said external device; and
- a managing section connected to said memory section and said clock section for judging whether or not the battery module can be exchanged based on use information of said battery, and for memorizing the use information of said battery generated by using time information from said clock section to said memory section; and
- a GND level fixation section for fixing the signal level on a signal line between said managing section and said battery module at the GND level when exchanging said battery module.

8. The battery managing system according to claim 7, further comprising a power supply control section for intercepting a power supply to said memory section and said clock section when exchanging said battery module.

* * * * *